United States Patent [19]
Janis et al.

[11] Patent Number: 5,155,850
[45] Date of Patent: Oct. 13, 1992

[54] METHOD AND SYSTEM FOR MAINTAINING A TIME FRAME SELECTIVE DOCUMENT HISTORY LOG IN A DATA PROCESSING SYSTEM

[75] Inventors: Frederick L. Janis, Keller; Marvin L. Williams, Lewisville; Diana S. Wang, Trophy Club, all of Tex.

[73] Assignee: International Business Machines Corporation, Armonk, N.Y.

[21] Appl. No.: 484,606

[22] Filed: Feb. 23, 1990

[51] Int. Cl.⁵ .................... G06F 11/34; G06F 15/40
[52] U.S. Cl. ............................ 395/600; 364/DIG. 1; 364/285; 364/282.1; 364/281.3; 364/264
[58] Field of Search .................. 395/600, 650, 700

[56] References Cited
U.S. PATENT DOCUMENTS

| | | | |
|---|---|---|---|
| 4,658,351 | 4/1987 | Teng | 395/650 |
| 4,751,702 | 6/1988 | Beier et al. | 395/600 |
| 4,792,921 | 12/1988 | Corwin | 365/600 |
| 4,809,170 | 2/1989 | Leblang et al. | 395/600 |
| 4,878,167 | 10/1989 | Kapulka et al. | 395/575 |
| 5,043,866 | 8/1991 | Myre, Jr. et al. | 395/600 |

Primary Examiner—Kevin A. Kriess
Attorney, Agent, or Firm—Andrew J. Dillon

[57] ABSTRACT

A method for maintaining a time frame selective document history log within a data processing system having multiple resource objects which are accessible by a plurality of users within the data processing system. A history log is created and associated with each resource object for which a document history log is desired. Next, a selected date-time frame of interest is specified and utilized to filter all activities which take place with respect to a particular resource object. Thereafter, only those activities which take place within the selected date-time frame of interest are recorded within the document history log. In one embodiment of the present invention a user may further specify that only selected activities which occur within the date-time frame of interest shall be recorded. In this manner it is possible to accurately record only selected activities during a pre-specified date-time frame such that memory space within the system is more efficiently utilized within the document history log.

12 Claims, 3 Drawing Sheets

METHOD AND SYSTEM FOR MAINTAINING A TIME FRAME SELECTIVE DOCUMENT HISTORY LOG IN A DATA PROCESSING SYSTEM

CROSS-REFERENCE TO RELATED APPLICATIONS

The present application is related to the following United States patent applications, each by the inventors hereof, filed of even date herewith an assigned to the assignee herein:

U.S. patent application Ser. No. 07/484,701, entitled "Method For Memory Management Within A Document History Log In A Data Processing System", now U.S. Pat. No. 5,142,663.

U.S. patent application Ser. No. 07/484,704, entitled "Method For Automatic Generation of Document History Log Exception Reports In A Data Processing System", now U.S. Pat. No. 5,128,885.

U.S. patent application Ser. No. 07/484,706, entitled "System For Recording At Least One Selected Resource Object Within A Distributed Data Processing System", now U.S. Pat. No. 5,119,493; and U.S. patent application Ser. No. 07/484,705, entitled "Method For Maintaining An Alterable Document History Log In A Data Processing System", now U.S. Pat. No. 5,062,045.

The contents of each of the above-referenced applications are hereby incorporated herein by reference thereto.

BACKGROUND OF THE INVENTION

1. Technical Field

The present invention relates in general to data processing systems and in particular to an improved method of maintaining multiple resource objects within a data processing system. Still more particularly, the present invention relates to a method for maintaining a time frame selective document history log in which only activities within a preselected time frame with respect to each resource object are recorded.

2. Description of the Related Art

In large modern data processing systems it is possible to create, store, and access literally thousands of documents or resource objects. Such activities may take place with regard to many users within a data processing system and it is often necessary to keep track of selected resource objects within the system to assure system integrity and maintain a record with regard to selected resource objects or documents within the system.

Document history logs are well known in the prior art. Many operating systems, database management subsystems and network subsystems marketed by International Business Machines of Armonk, N.Y. incorporate logging facilities. For example, the Multiple Virtual Storage (MVS) operating system provides a logging system to the console operator so that all commands by the operator as well as the responses of the system are logged. Additionally, other events within the system may be written to the operator log. The logging filter in this system is set system wide for all resources within the system by the system programmer. As with all such logging systems this system may be utilized to provide a record for problem reconciliation and to provide an audit trait for security purposes.

Database management systems, such as Customer Information Control System (CICS) and Information Management System (IMS) also utilize a history log. Such history logs are typically utilized to audit events and changes within the database. These logs are then utilized to reconstruct the database in the event of an abnormal termination of the system. As above, such logs record all counts within the system based upon a filter set for the entire system by the database administrator.

Finally, certain network communications subsystems, such as VTAM, or Virtual Telecommunication Access Method utilize a history log system to log all network commands and responses. These logs are utilized for problem solving and are generally written to tape or disk storage.

In view of the above, it should be apparent that a need exists for a document history log which may be specified for individual resources within a system so that only those activities which take place within a selected time frame with regard to a particular resource will be stored within the log.

SUMMARY OF THE INVENTION

It is therefore one object of the present invention to provide an improved data processing system.

It is another object of the present invention to provide an improved method of maintaining multiple resource objects within a data processing system.

It is yet another object of the present invention to provide a method for maintaining a time frame selective document history log in which only activities which occur within a preselected time frame with respect to a particular resource object are recorded.

The foregoing objects are achieved as is now described. The method of the present invention may be utilized to maintain a time frame selective document history log with regard to multiple resource objects within a data processing system, each of which may be accessible by a plurality of users within the system. A history log is created and associated with each resource object for which a document history log is desired. Next, a selected date-time frame of interest is specified and utilized to filter all activities which take place with respect to a selected resource object. Thereafter, only those activities which take place within the selected date-time frame of interest are recorded within the document history log. In one embodiment of the present invention, a user may further specify that only selected activities which occur within the time frame of interest shall be recorded. In this manner it is possible to accurately record only selected activities during a prespecified time frame such that memory space within the system is more efficiently utilized within the document history log.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
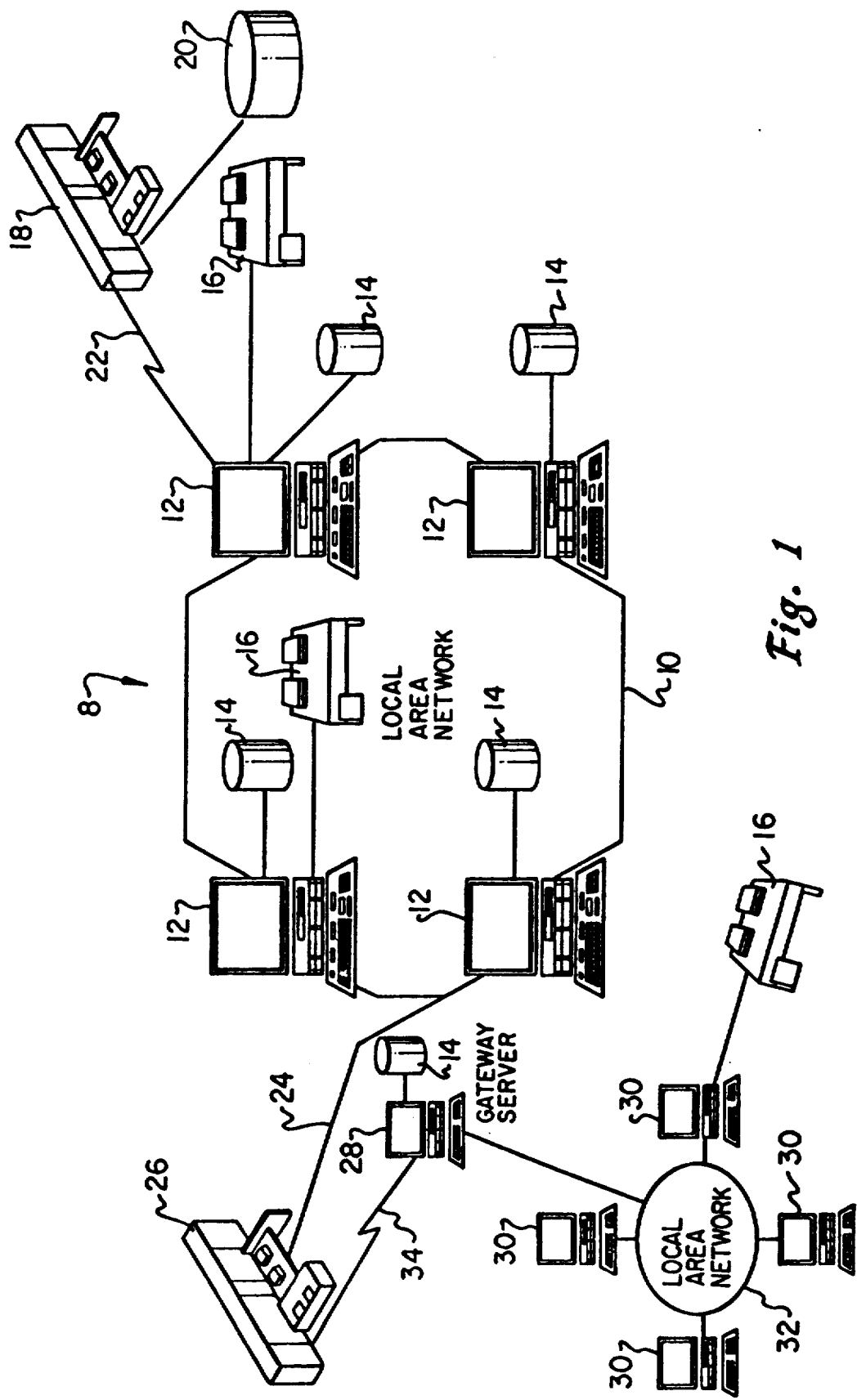
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 is associated with a Resource Manager or Library Service, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager of Library Service for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in Calif. while Local Area Network (LAN) 10 may be located within Tex. and main frame computer 18 may be located in N.Y.

In known prior art systems of this type it is common for a user in one area of distributed data processing system 8 to access and/or modify a document or resource object within another portion of distributed data processing system 8. It should therefore be apparent that it would be very helpful to have a system whereby the activities of any or all of the users within distributed data processing system 8 with respect to a particular document or resource object may be recorded. However, with known document history log approaches the vast number of users within a distributed data processing system, such as the system illustrated, would clearly overwhelm which simply records each and every activity with regard to a particular resource object.

Figure 2:
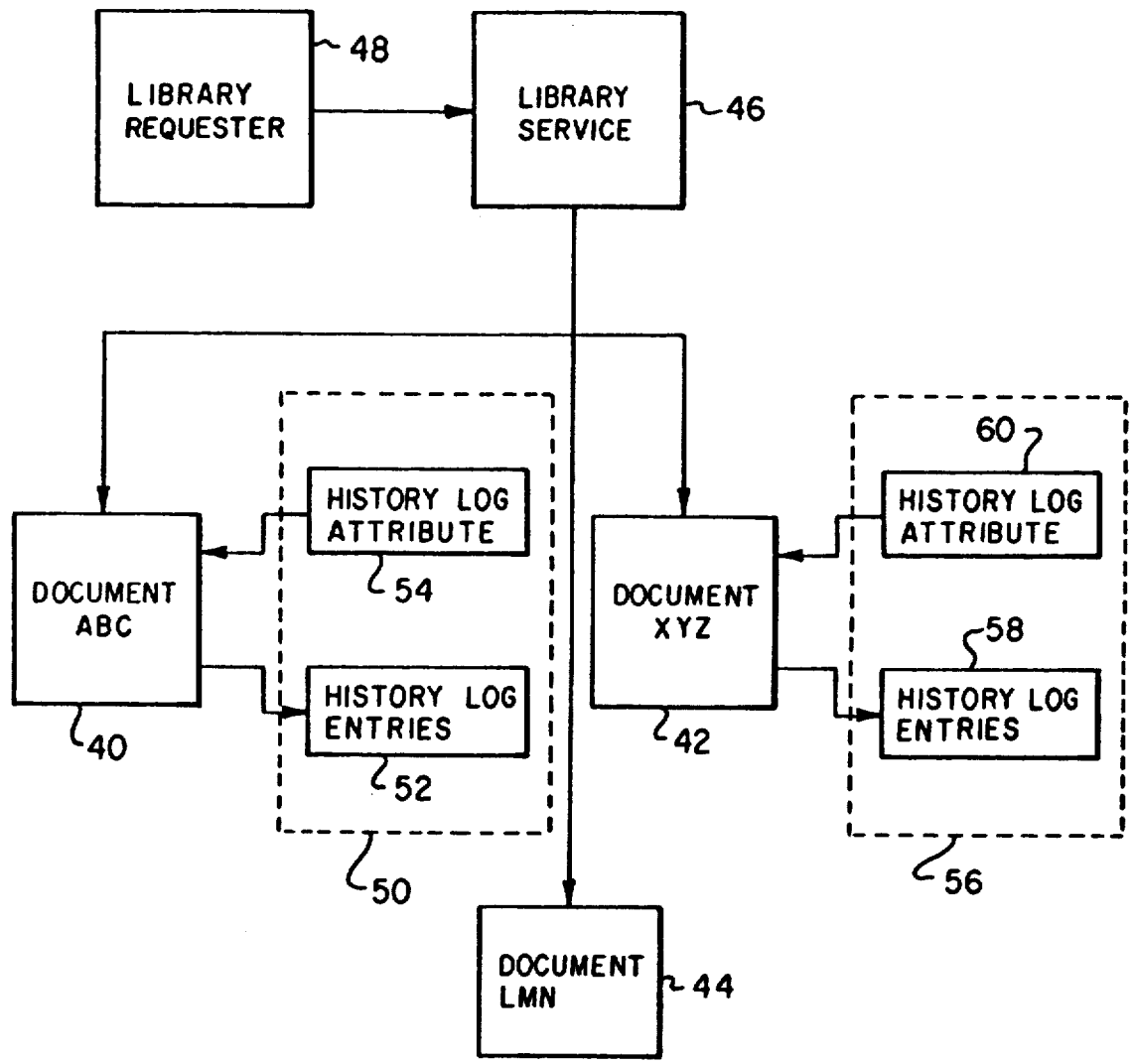
FIG. 2 depicts in block diagram form the time frame selective document history log system in accordance with the method of the present invention.

Referring now to FIG. 2, there is depicted a block diagram representation of a selective document history log implemented in accordance with the method of the present invention. As can be seen, three documents are represented. Document ABC 40, document XYZ 42 and document LMN 44 are all illustrated as being under the control of library service 46. As discussed above, library service 46 may be implemented utilizing any entity within distributed data processing system 8 (see FIG. 1) which is capable of acting as a resource manager for the documents thus illustrated. Additionally, a library requester 48 is illustrated. Library requester 48 shall correspond to any user within distributed data processing system 8 who desires to access a document or resource object controlled by library service 46.

As is illustrated, each and every document controlled by library service 46 does not require a document history log, in accordance with the method of the present invention. As is illustrated, document ABC 40 and document XYZ 42 both have associated therewith a document history log. That is, document history log 50 is associated with document ABC 40 and document history log 56 is associated with document XYZ 42. Document LMN 44 does not require a history log and no such log is illustrated.

In accordance with an important aspect of the present invention, it should be noted that each document history log thus illustrated includes two separate portions thereof. Specifically, document history log 50 includes a section labeled history log entries 52 and a section labeled history log attribute 54. Similarly, document history log 56 includes a section labeled history log entries 58 and history log attribute 60.

As those skilled in the art will appreciate, each history log entry section shall preferably comprise a memory location wherein the recordation of activities with regard to an associated document may take place. However, history log attributes 54 and 60 are utilized, in accordance with the method of the present invention, to specify a particular time frame with regard to each document associated with the history log for which a recording of activities is desired.

For example, it may be desired to record only those activities of any library requester who attempts to alter a document within a specific time frame. Thus, the activities of library requesters relating to a specified document either before or after the specified time frame will result in no entries being recorded within the document history log.

Additionally, in accordance with one aspect of the present invention, a user may further specify that only selected activities which occur within the specified time frame shall be recorded. In this manner, it will be possible to record only selected activities of library requesters which occur within a particular preestablished time frame. For example, the activities of those library requesters who modify a document within a specific time frame may result in an entry being recorded within the document history log if the modification activity is specified.

In this manner it is possible to provide a time frame selective history log in which a time frame of interest is specified within the document history log and thereafter only those activities which take place within the time frame of interest to the system administrator or manager are entered. This method provides a more efficient utilization of memory space within a document history log such that thousands of activities which are of no interest to the system administrator may take place without filling valuable memory space. By specifying within the document history log the time frame of interest a subsequent user may determine that only those activities which take place within the specified time frame have been recorded. Of course, as disclosed in one of the cross-referenced applications each memory portion within a document history log may have associated therewith a protocol to follow in the event the memory space of the document history log does become filled. For example, the protocol may specify that new activity log shall be written over the oldest activity log stored within the memory space.

It should be apparent that within each memory location corresponding to a history log it will be possible to store additional parameters associated with the activities which take place with respect to a particular document within a specified time frame. For example, user information may be stored, as well as date and time information. A version number or version reference may be stored as well as the reviser's personal name and any comments which the reviser desires to leave within the history log.

Figure 3:
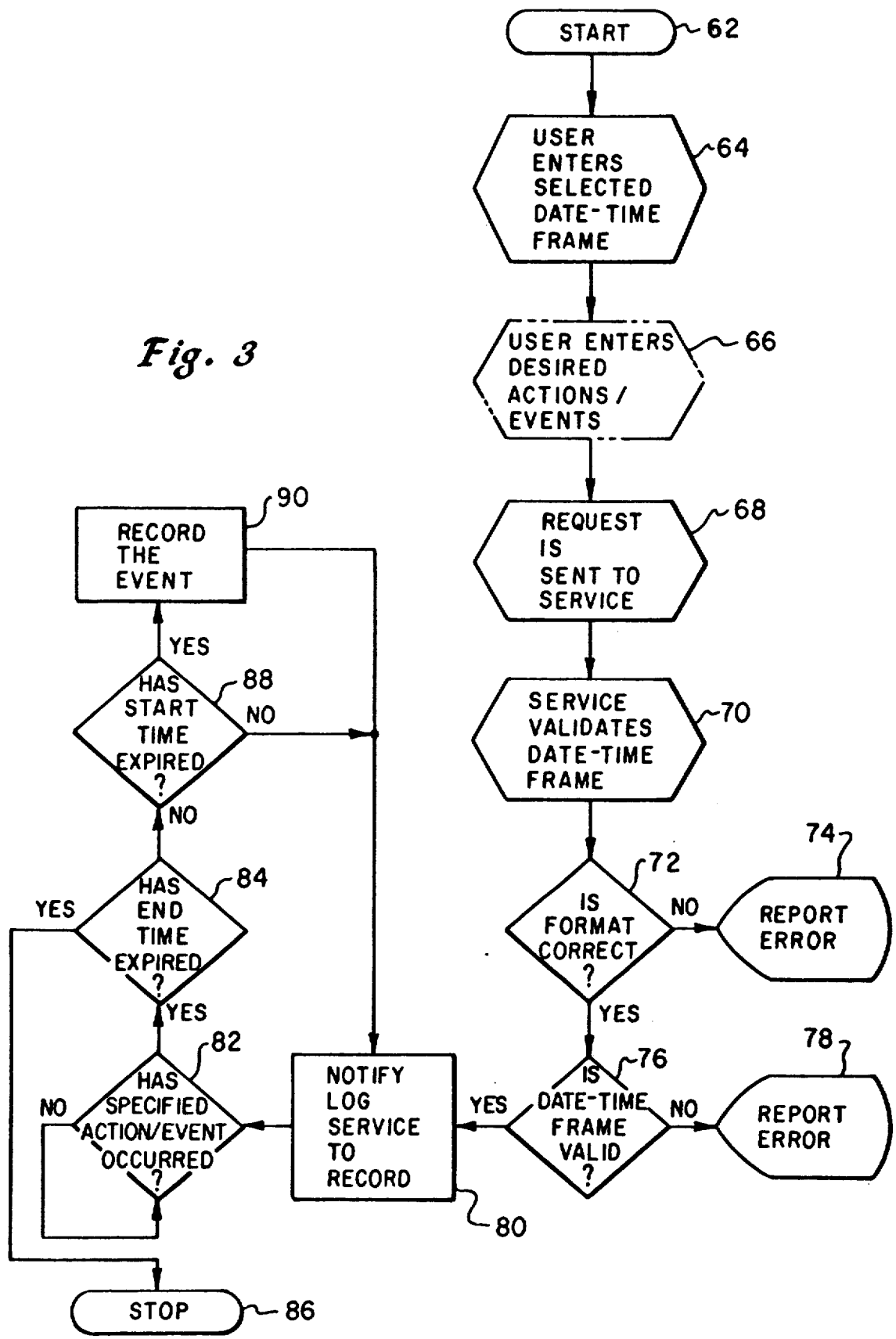
FIG. 3 is a high level flow chart depicting the method for maintaining a time frame selective document history log in accordance with the method of the present invention.

With reference now to FIG. 3 there is depicted a high level flow chart which illustrates the method of maintaining a time selective document history log in a data processing system in accordance with the method of the present invention. As is illustrated, the process begins at block 62 and thereafter passes to block 64 which illustrates the entering by a user of a selected date-time frame during which the activities with respect to a particular resource object are to be recorded. Next, block 66 illustrates the optional step of the user specifying desired actions and/or events which are to be recorded. In this manner, the user may specify a particular time frame and a specified group of actions which are to be recorded, if they occur during the specified time frame. Next, the user request is sent to the service for the particular data processing system, as illustrated in block 68.

Block 70 now illustrates the validation by the service of the selected date-time frame and thereafter block 72 depicts a determination of whether or not the format selected by the user is an acceptable format to the service. If not, block 74 illustrates the reporting of an error message to the user.

In the event the user has entered the desired date-time frame in a correct format, as determined by block 72, then block 76 illustrates a determination of whether or not the entered date-time frame is valid. Of course, those skilled in the art will appreciate that the system administrator may specify, in order to conserve memory space, that a particular limit shall be imposed upon the amount of time which may be specified by the user for document history log recording. In the event the specified date-time frame is not valid, as determined in block 76, then block 78 illustrates the reporting of an error message to the user.

In the event the date-time frame specified by the user is valid in accordance with system constraints, then block 80 illustrates the notification of the document history log service that recording shall take place in accordance with the parameters previously specified by the user. Next, block 82 illustrates a determination of whether or not a specified action/event has occurred. If not, the system continues in an iterative fashion until a specified action/event occurs. Of course, in the event the user has not specified that only particular actions are to be recorded, then the process proceeds to block 84 wherein it is determined whether or not the end time of the specified date-time frame has expired. If so, the process terminates, as illustrated in block 86.

In the event the end time of the specified date-time frame has not expired then block 88 illustrates a determination of whether or not the start time in the specified date-time frame has expired. If the start time has not yet expired, indicating that the specified date-time frame has not yet begun, then the process returns to block 80 and continues in an iterative fashion. However, in the event the start time has expired, as determined in block 88, then an event which occurs within the specified date-time frame will be recorded, as depicted in block 90. Again, the process thereafter returns to block 80 and continues in an iterative fashion.

Upon reference to the foregoing those skilled in the art will appreciate that the Applicants in the present invention have developed a method whereby only those activities which occur within a preselected date-time frame with respect to particular resource objects shall be stored within a document history log. In this manner, the control and maintenance of document or resource objects within a distributed data processing system may be efficiently carried out without an undue burden with regard to memory space or processing, as with known document history logs.

While the invention has been particularly shown and described with reference to a preferred embodiment, it will be understood by those skilled in the art that various changes in form and detail may be made therein without departing from the spirit and scope of the invention.

We claim:

1. A method in a data processing system of efficiently maintaining a record of activities relating to a selected resource object accessible by a plurality of users within said data processing system, said method comprising the data processing system implemented steps of:
   creating a history log within said data processing system associated with a selected resource object;
   specifying a selected data-time frame of interest with respect to said selected resource object; and
   recording within said history log only those activities occurring within said selected date-time frame.

2. The method in a data processing system of efficiently maintaining a record of activities relating to a selected resource object accessible by a plurality of users within said data processing system according to claim 1 further including the step of determining whether or not said selected date-time frame is within predetermined system criteria.

3. The method in a data processing system of efficiently maintaining a record of activities relating to a selected resource object accessible by a plurality of users within said data processing system according to claim 2, further including the step of generating an indication if said selected date-time frame is not within said predetermined system criteria.

4. The method in a data processing system of efficiently maintaining a record of activities relating to a selected resource object accessible by a plurality of users within said data processing system according to claim 1, further including the step of specifying particular activities of interest with respect to said selected resource object.

5. The method in a data processing system of efficiently maintaining a record of activities relating to a selected resource object accessible by a plurality of users within said data processing system according to claim 4, wherein said step of recording within said history log only those activities occurring within said selected date-time frame comprises the step of recording only those particular activities of interest occurring within said selected date-time frame.

6. The method in a data processing system of efficiently maintaining a record of activities relating to a selected resource object accessible by a plurality of users within said data processing system according to claim 1, further including the step of recording within said document history log said specified date-time frame of interest.

7. A data processing system for efficiently maintaining a record of activities relating to a selected resource object accessible by a plurality of users within said data processing system, said data processing system comprising:
 a history log within said data processing system, said history log associated with a selected resource object;
 means for permitting a user to specify a selected date-time frame of interest with respect to said selected resource object; and
 means for recording within said history log only those activities occurring within said selected date-time frame.

8. The data processing system for efficiently maintaining a record of activities relating to a selected resource object accessible by a plurality of users within said data processing system according to claim 7, further including means for determining whether or not said selected date-time frame is within predetermined system criteria.

9. The data processing system for efficiently maintaining a record of activities relating to a selected resource object accessible by a plurality of users within said data processing system according to claim 8, further including means for generating an indication if said selected date-time frame is not within said predetermined system criteria.

10. The data processing system for efficiently maintaining a record of activities relating to a selected resource object accessible by a plurality of users within said data processing system according to claim 7, further including means for permitting a user to specify particular activities of interest with respect to said selected resource object.

11. The data processing system for efficiently maintaining a record of activities relating to a selected resource object accessible by a plurality of users within said data processing system according to claim 10, wherein said means for recording within said history log only those activities occurring within said selected date-time frame comprises means for recording only those particular activities of interest occurring within said selected date-time frame.

12. The data processing system for efficiently maintaining a record of activities relating to a selected resource object accessible by a plurality of users within said data processing system according to claim 7, further including means for recording within said document history log said specified date-time frame of interest.

* * * * *